(12) United States Patent
Army, Jr. et al.

(10) Patent No.: US 6,688,184 B2
(45) Date of Patent: Feb. 10, 2004

(54) SENSOR MANIFOLD FOR A FLOW SENSING VENTURI

(75) Inventors: Donald E. Army, Jr., Enfield, CT (US); Michael D. Greenberg, Bloomfield, CT (US)

(73) Assignee: Hamilton Sunstrand, Windsor Locks, CT (US)

( * ) Notice: Subject to any disclaimer, the term of this patent is extended or adjusted under 35 U.S.C. 154(b) by 159 days.

(21) Appl. No.: 10/061,588

(22) Filed: Feb. 1, 2002

(65) Prior Publication Data

US 2003/0145660 A1 Aug. 7, 2003

(51) Int. Cl.[7] .................................................. G01F 1/44
(52) U.S. Cl. ................................................... 73/861.63
(58) Field of Search ........................ 73/861.63, 861.52, 73/861.61

(56) References Cited

U.S. PATENT DOCUMENTS

| | | | |
|---|---|---|---|
| 4,741,411 A | * | 5/1988 | Stricker ....................... 181/283 |
| 5,036,884 A | * | 8/1991 | Miller et al. ................ 73/118.1 |
| 5,664,760 A | | 9/1997 | Army, Jr. et al. |
| 5,690,135 A | | 11/1997 | Dehais |
| 5,924,673 A | | 7/1999 | Welker |
| 5,956,960 A | | 9/1999 | Niggeman |
| 6,093,238 A | | 7/2000 | Huf |
| 6,151,909 A | | 11/2000 | Carter et al. |
| 6,189,324 B1 | | 2/2001 | Williams et al. |
| 6,216,981 B1 | | 4/2001 | Helm |

\* cited by examiner

*Primary Examiner*—Edward Lefkowitz
*Assistant Examiner*—Corey D. Mack
(74) *Attorney, Agent, or Firm*—Carlson, Gaskey & Olds

(57) ABSTRACT

A flow sensing venturi system includes a venturi body and a manifold mounted thereto. The manifold is thermally isolated from the venturi body. A multiple of sensor ports are formed into the manifold which support each individual sensor and provide communication between the sensor and one or more passageways. The passageways communicate with a single high-pressure and a single low-pressure sense line. The high and low pressure sense line tap respective high and low pressure areas within the venturi body. The sensor is individually screwed into the manifold to provide an airtight connection for two independent sensor input ports. Replacement of individual sensors is thereby greatly simplified.

22 Claims, 4 Drawing Sheets

SENSOR MANIFOLD FOR A FLOW SENSING VENTURI

BACKGROUND OF THE INVENTION

The present invention relates to a flow sensing venturi, and more particularly to a manifold which supports a multiple of sensors adjacent the flow sensing venturi.

A flow sensing venturi is typically provided in an aircraft environmental control systems (ECS). The venturi includes a multiple of electronic pressure sensors to measure airflow bled from a gas turbine engine. Each sensor communicates with the interior of the venturi through one or more sense lines which individually extend from the sensor and tap fluid flow through the venturi. Data from the sensor is then provided to an ECS digital controller to assure proper operation and control.

Each sensor is also thermally isolated from the venturi to enhance sensor reliability. Typically, a thermally isolated clamp locates each sensor a distance away from the venturi. The sense lines are relatively long to span the distance between the venturi and the thermally isolated sensors. An intricate arrangement of sensors, each having a multiple of sense lines is therefore mounted to the venturi.

It is desirable to provide for the removal and replacement of individual sensors, without removing the venturi from its installed position. Such maintenance may be further complicated when the venturi is installed within the confines of an aircraft as the mechanic must disconnect numerous pneumatic fittings and clamps within the tight space constraints of an aircraft environment. Moreover, following the replacement of an individual sensor, each individual connection of each sense line must be checked for leakage to assure proper function. This is again hindered by the tight space constraints.

Accordingly, it is desirable to provide a venturi having a line replaceable unit (LRU) sensor mounting arrangement that simplifies the in-situ removal and replacement of individual sensors within a space constrained installation.

SUMMARY OF THE INVENTION

The flow sensing venturi system according to the present invention includes a venturi body and a manifold mounted thereto. The manifold defines a multiple of sensor ports such that each sensor may be individually screwed into the manifold without connecting a multiple of sense lines.

The sensor is threaded into a threaded fitting located within the sensor port. The sensor threaded fitting surrounds a high pressure input port such that when the sensor is threaded into the sensor port, the high pressure input port is in communication with a high pressure passage formed in the manifold. A single high-pressure sense line communicates between the high-pressure passage and a high pressure region within the interior of the venturi body.

A low-pressure input port radially extends from the sensor adjacent the high pressure input port. A seal such as an O-ring is located about the outer diameter of the sensor opposite the high-pressure input port and past the low-pressure input port. The seal assures an airtight fit between the sensor and the sensor port such that the low pressure input port is sealed from ambient. That is, irrespective of the radial position of the low pressure input port within the low pressure radial area—due to the sensor being threaded into place—the seal assures that the low pressure input port is isolated from ambient air pressure. A single low-pressure sense line communicates between the low pressure passage and a low pressure region within the interior of the venturi body.

Advantageously, the single high and low pressure sense lines need not be disconnected to replace an individual sensor. A single threaded connection provides an airtight connection for two independent sensor input ports. The present invention therefore provides a venturi having a line replaceable unit (LRU) sensor mounting arrangement that simplifies the in-situ removal and replacement of individual sensors within a space constrained installation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
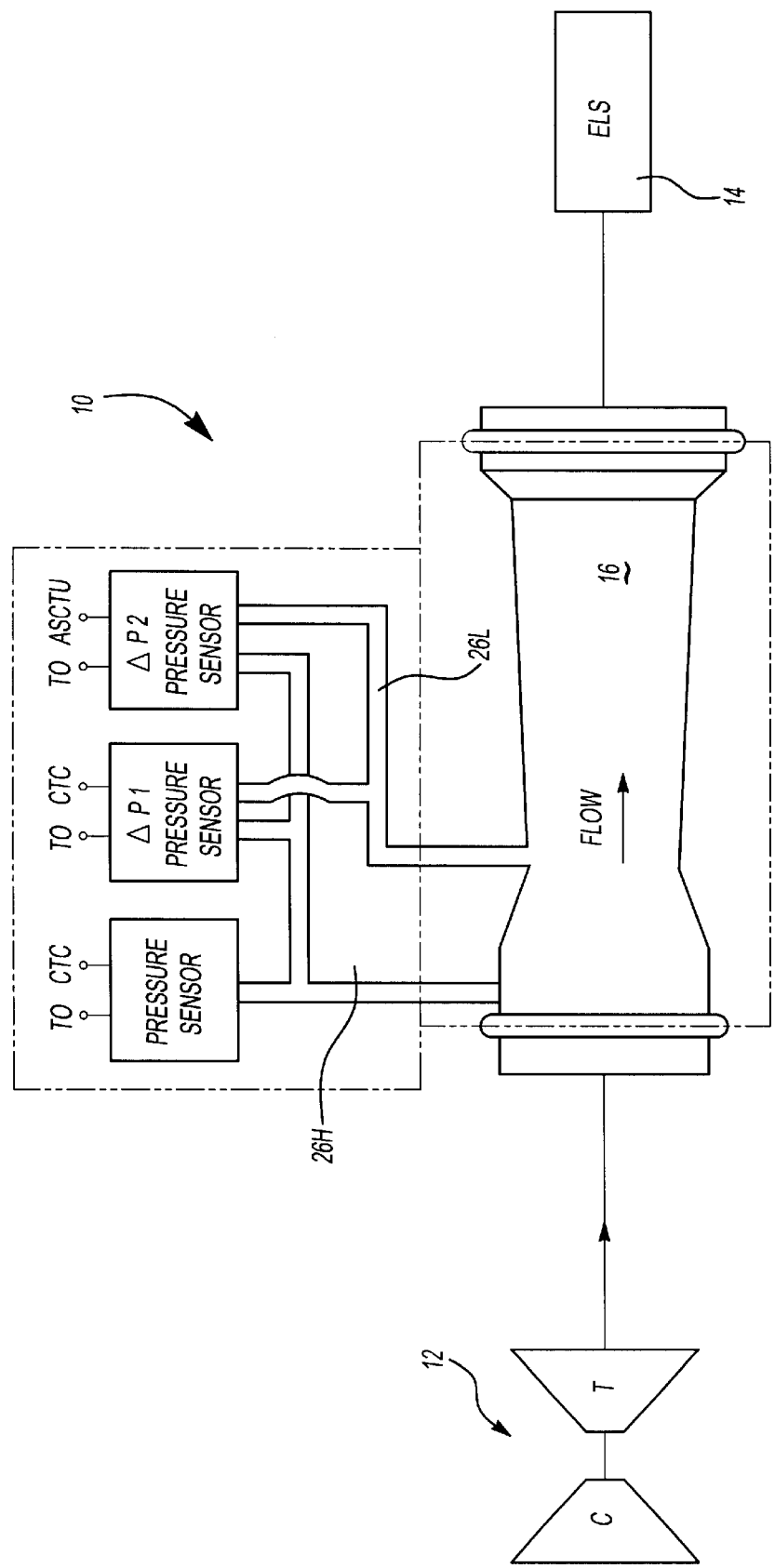
FIG. 1 is a schematic view of a flow sensing venturi system according to the present invention.

FIG. 1 illustrates a general schematic view of a flow sensing venturi system 10. The flow sensing venturi system 10 is preferably located in a bleed air line from a gas turbine engine (illustrated schematically at 12) as part of an aircraft Environmental Control System (ECS; illustrated schematically at 14). It should be understood that other high-pressure fluid flow systems will also benefit from the present invention.

Figure 2:
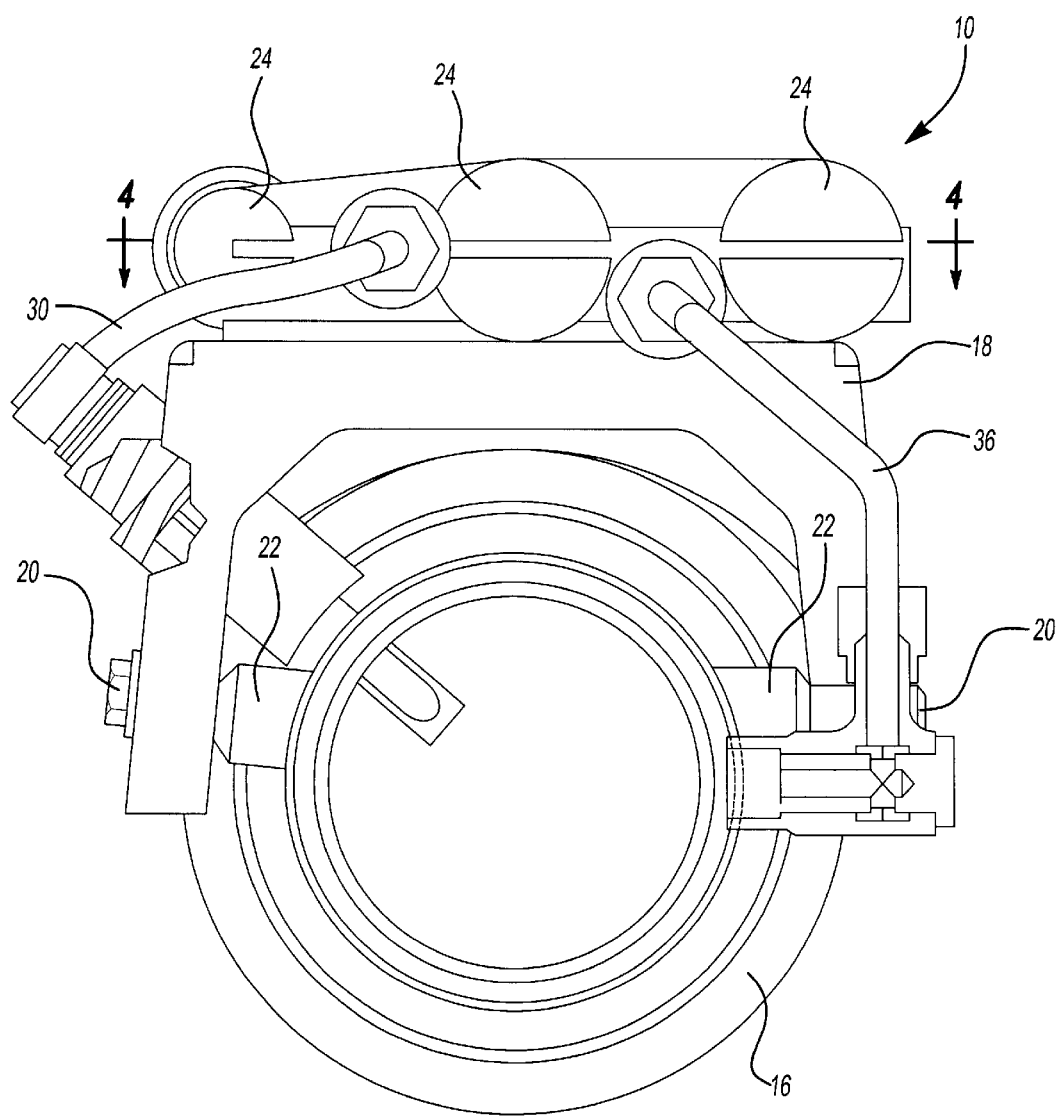
FIG. 2 is a perspective view of the flow sensing venturi system.

Referring to FIG. 2, the flow sensing venturi system 10 includes a venturi body 16 and a manifold 18 mounted thereto. A multiple of sensors 20 communicate with the interior of the venturi body 16 through the manifold 18. As generally known, the venturi body 16 provides for measurement of fluid flow therethrough. The venturi body defines a flow axis F.

Figure 3:
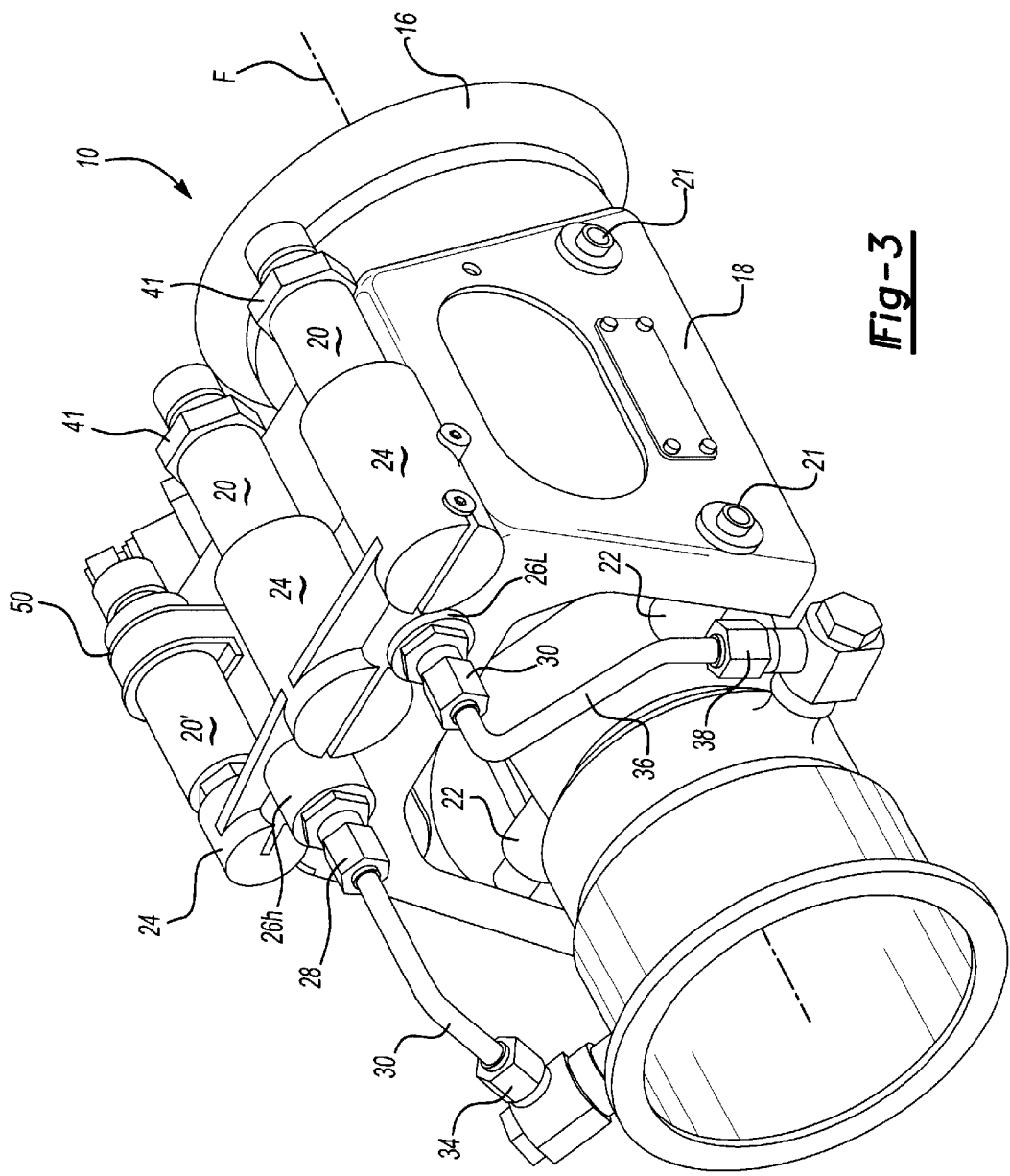
FIG. 3 is a front perspective view of the flow sensing venturi.

The manifold 18 is mounted to the venturi body 16 by fasteners 21 which are threaded into bosses 22 extending from the venturi body 16. The manifold 18 is preferably formed as a bridge-like structure which is spaced away from the venturi body 16 by the bosses 22 (FIG. 3.) A heat shield or the like may additionally be mounted between the manifold 18 and the venturi body 16. The manifold 18 is thereby thermally isolated from the venturi body 16. Preferably, the manifold 18 is manufactured of an aluminum alloy to provide lightweight and high strength.

Figure 4:
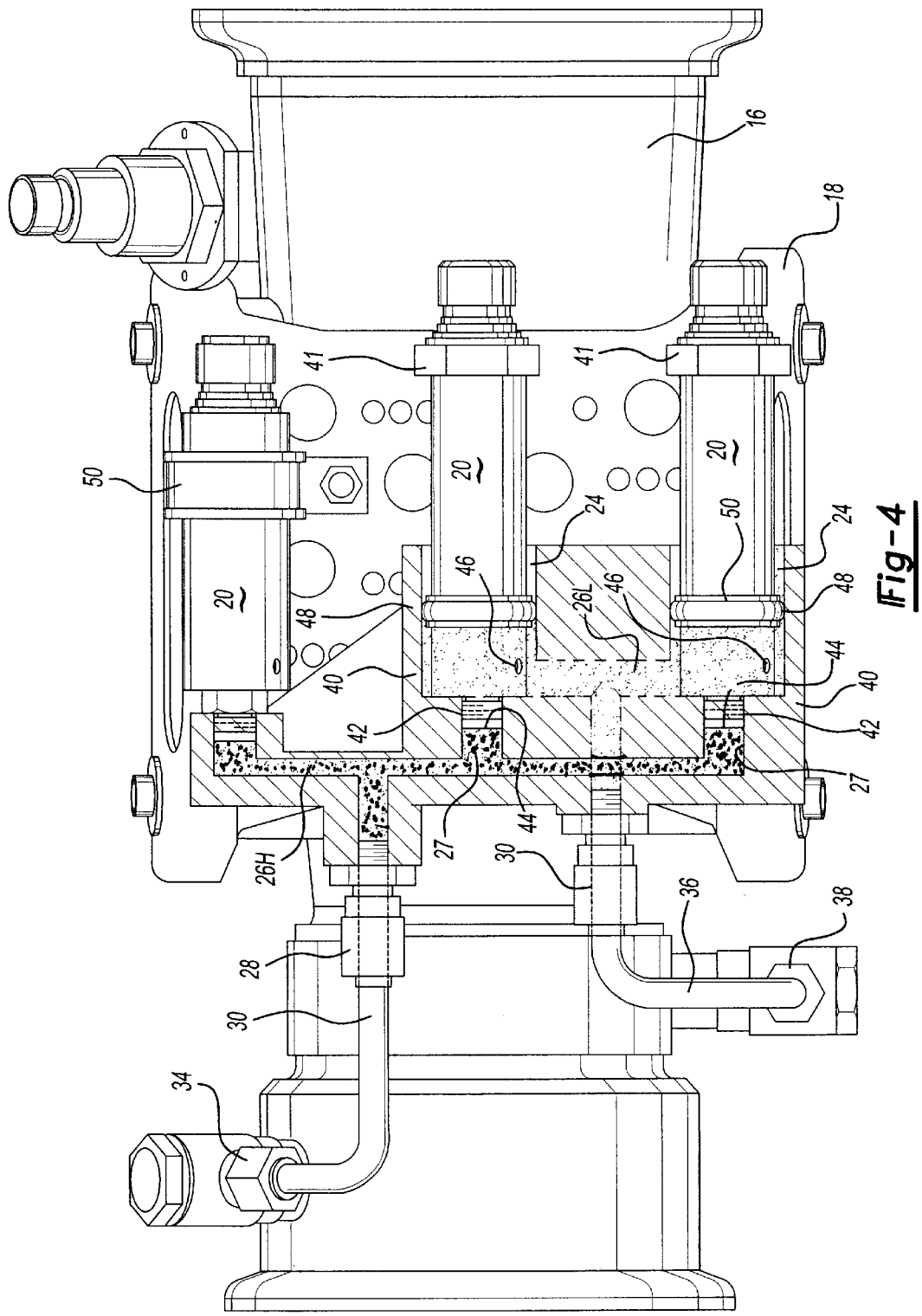
FIG. 4 is a partial sectional top view of the manifold of the flow sensing venturi system illustrating the passageways according to the present invention.

The manifold 18 defines a multiple of sensor ports 24 to receive a sensor 20. The sensor ports 24 are arranged substantially parallel to the flow axis F. Each sensor port 24 provides communication between the sensor 20 and one or more passageways 26 formed in the manifold 18. The passageways 26 preferably define a high-pressure passage 26H and a low pressure passage 26L (also schematically illustrated in FIGS. 1 and 4). The high-pressure passage 26H preferably communicates with a threaded fitting 27 located in an axial end of the sensor port 24 (FIG. 4.) The threaded fittings 27 communicate with each other through the high-pressure passage 26H which exits the manifold 18 at a single common high-pressure fitting 28. The low-pressure passage 26L also communicates with a multiple of the sensor ports 24. The low-pressure passage 26L exits the manifold 18 at a single common low-pressure fitting 30.

A single high-pressure line 30 communicates between the high pressure fitting 28 and a high-pressure tap 34 located in the venturi housing 16. A single low-pressure line 36 communicates between the low pressure fitting 30 and a low-pressure tap 38 located in the venturi housing 16. The high-pressure tap 34 communicates with a high pressure region within the interior of the venturi body 16 and the low pressure tap 38 communicates with a low pressure region within the interior of the venturi body 16 (also schematically illustrated in FIG. 1.) Preferably, the high and low pressure taps and fittings are threaded connections to provide for disassembly. Advantageously, these sense lines need not be disconnected to replace an individual sensor 20.

Referring to FIG. 4, each sensor 20 is removably mounted within each sensor port 24. The sensor 20 preferably includes a threaded fitting 42 such that the sensor 20 is simply threaded into the threaded fittings 27 within the sensor port 24. The threaded fitting 42 axially extends from one end of the sensor 20 and surrounds a high pressure sensor input port 44. When the sensor 20 is threaded into the threaded fittings 27, the sensor input port 44 is in communication with the high pressure passage 26H. Preferably, the threaded connection 42 is treated with a conductive coating to provide a conductive path which minimizes electrostatic discharge. Coating of the threaded connection eliminates the heretofore necessity of electrical bonding springs.

Each sensor 20 preferably includes wrench flats 41 to assist in tightening the sensor 20 into the threaded fittings 27. It should be understood that the wrench flats 41 may be located at any convenient and accessible location along the sensor 20.

A low pressure input port 46 radially extends from the sensor 20 adjacent the high pressure input port 44. A seal 48 such as an O-ring is preferably located within a groove 50 formed about the sensor 20. The seal 48 is located about the outer diameter of the sensor 20 opposite the high pressure input port 44 and past the low pressure input port 46. The seal 48 assures an airtight fit between the sensor 20 and the sensor port 24 of the manifold 18 such that the low pressure input port 46 is sealed from ambient. The seal 48 thereby forms a low pressure radial area 40 within the sensor port. That is, irrespective of the radial position of the low pressure input port 46 within the low pressure radial area 40—due to the sensor being threaded into place—the seal 48 assures that the low pressure input port 46 is isolated from ambient air pressure. Thus, single threaded connection provides an airtight connection for two independent input ports. Replacement of an individual sensor is greatly simplified.

The seal 48 also supports the sensor 40 within the sensor port 24 such that additional clamps or mounting brackets are eliminated. It should be understood, however, that the manifold 18 may alternatively or additionally support a cushion clamp 52 which supports a sensor 20'. This may be particularly appropriate for an absolute sensor which only requires a high pressure input port.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flow sensing venturi system comprising:

a venturi body defining an axis;

a manifold mounted to said venturi body, said manifold having a plurality of sensor ports arranged substantially parallel to the axis, each of said sensor ports in communication with a plurality of passages in communication with an interior of said venturi body.

2. The flow sensing venturi as recited in claim 1, further comprising a sensor mounted at least partially within said sensor port.

3. The flow sensing venturi as recited in claim 2, further comprising a threaded connection between said sensor and said manifold.

4. The flow sensing venturi as recited in claim 2, further comprising a seal between said sensor and said sensor port.

5. The flow sensing venturi as recited in claim 1, wherein said manifold is thermally isolated from said venturi body.

6. The flow sensing venturi as recited in claim 1, wherein said plurality of passages communicate with a single high pressure line and a single low pressure line extending between said manifold and said venturi body.

7. The flow sensing venturi as recited in claim 1, wherein said manifold forms a bridge structure spaced away from said venturi body.

8. The flow sensing venturi as recited in claim 1, further comprising a heat shield between said manifold and said venturi body.

9. The flow sensing venturi as recited in claim 1, wherein each of said sensor ports are substantially tubular.

10. The flow sensing venturi as recited in claim 1, wherein said plurality of sensor ports comprise a first sensor port which communicates with a first passage and a second passage of said plurality of passages, said first passage communicates with said first sensor port through a threaded connection at an axial end of said first sensor port and said second passage conununicates with said first sensor port through a radial portion or said sensor port.

11. A flow sensing venturi system comprising:

a venturi body defining an axis;

a manifold thermally isolated from said venturi body, said manifold having a plurality of sensor ports arranged substantially parallel to the axis, each of said sensor ports in communication with a plurality of passages which are in communication with an interior of said venturi body; and a sensor mounted to each of said sensor ports, said sensor in communication with said plurality of passages.

12. The flow sensing venturi as recited in claim 11, further comprising a threaded connection between said sensor and said manifold.

13. The flow sensing venturi as recited in claim 12, wherein said threaded connection surrounds an input port to said sensor.

14. The flow sensing venturi as recited in claim 11, further comprising a seal between said sensor and said sensor port.

15. The flow sensing venturi as recited in claim 14, wherein said seal is mounted about an outer diameter of said sensor.

16. The flow sensing venturi as recited in claim 14, further comprising an input port radially extending through an outer diameter of said sensor.

17. The flow sensing venturi as recited in claim 11, wherein said plurality of passages communicate with a single high pressure line and a single low pressure line extending between said manifold and venturi body.

18. The flow sensing venturi system as recited in claim 11, wherein said manifold forms a bridge structure spaced away from said venturi body.

19. The flow sensing venturi as recited in claim 9, further comprising a heat shield between said manifold and said venturi body.

20. The flow sensing venturi as recited in claim 11, wherein each of said sensor ports are substantially tubular.

21. The flow sensing venturi as recited in claim 11, wherein said plurality of sensor ports comprise a first sensor port which communicates with a first passage and a second passage of said plurality of passages, said first passage communicates with said first sensor port through a threaded connection at an axial end of said first sensor port and said second passage communicates with said first sensor port through a radial portion of said sensor port.

22. The flow sensing venturi as recited in claim 11, further comprising a sensor mounted at least partially within said sensor port.

* * * * *

UNITED STATES PATENT AND TRADEMARK OFFICE
CERTIFICATE OF CORRECTION

PATENT NO. : 6,688,184 B2
DATED : February 10, 2004
INVENTOR(S) : Army, Jr. et al.

It is certified that error appears in the above-identified patent and that said Letters Patent is hereby corrected as shown below:

<u>Title page,</u>
Item [73], Assignee, should read as:
-- [73] Assignee: Hamilton Sundstrand, Windsor Locks, CT (US) --

Signed and Sealed this

Thirteenth Day of April, 2004

JON W. DUDAS
*Acting Director of the United States Patent and Trademark Office*